United States Patent
Zhang et al.

(10) Patent No.: US 12,265,950 B2
(45) Date of Patent: Apr. 1, 2025

(54) METHOD AND APPARATUS OF MATCHING DATA, DEVICE AND COMPUTER READABLE STORAGE MEDIUM

(71) Applicant: Beijing Baidu Netcom Science Technology Co., Ltd., Beijing (CN)

(72) Inventors: Jingshuai Zhang, Beijing (CN); Qifan Huang, Beijing (CN); Chao Ma, Beijing (CN); Hengshu Zhu, Beijing (CN); Peng Wang, Beijing (CN); Kaichun Yao, Beijing (CN); Jing Wang, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 297 days.

(21) Appl. No.: 17/564,363

(22) Filed: Dec. 29, 2021

(65) Prior Publication Data
US 2022/0129856 A1 Apr. 28, 2022

(30) Foreign Application Priority Data
Mar. 9, 2021 (CN) .......................... 202110262413.7

(51) Int. Cl.
*G06Q 10/1053* (2023.01)
*G06N 3/08* (2023.01)

(52) U.S. Cl.
CPC .......... *G06Q 10/1053* (2013.01); *G06N 3/08* (2013.01)

(58) Field of Classification Search
CPC .............................. G06Q 10/1053; G06N 3/08
See application file for complete search history.

(56) References Cited

U.S. PATENT DOCUMENTS

2016/0132831 A1* 5/2016 Sharma .............. G06Q 10/1053
 705/321
2019/0102704 A1* 4/2019 Liu ........................ G06N 20/00

FOREIGN PATENT DOCUMENTS

| CN | 107491540 A | 12/2017 |
| CN | 109271582 A | 1/2019 |
| CN | 111523040 A | 8/2020 |

(Continued)

OTHER PUBLICATIONS

Guo, Qingyu, et al. "A Survey on Knowledge Graph-Based Recommender Systems." arXiv preprint arXiv:2003.00911 (2020). (Year: 2020).*

(Continued)

*Primary Examiner* — Brendan S O'Shea
(74) *Attorney, Agent, or Firm* — Keating & Bennett, LLP (57) ABSTRACT

The present disclosure provides a method and an apparatus of matching data, a device and a computer-readable storage medium, which are related to the field of artificial intelligence technology, and in particularly to the field of intelligent search and deep learning. The specific implementation solution includes: obtaining a first instance of a resume and a second instance of a job profile; determining, for a meta path, a resume feature data of the first instance and a profile feature data of the second instance, the meta path is a knowledge graph path from the resume to the job profile; and applying a classification model to the resume feature data of the first instance and the profile feature data of the second instance to determine a matching result between the first instance and the second instance.

14 Claims, 6 Drawing Sheets

(56) References Cited

FOREIGN PATENT DOCUMENTS

| | | |
|---|---|---|
| CN | 112214683 A | 1/2021 |
| WO | 2018/040067 A1 | 3/2018 |

OTHER PUBLICATIONS

Bondarenko, Kirill "Similarity metrics in recommender systems" Medium, Feb. 27, 2019; available at: https://bond-kirill-alexandrovich.medium.com/similarity-metrics-in-recommender-systems-aed9d3b2315f (Year: 2019).*

Ozsoy, Makbule Gulcin, et al. "MP4Rec: Explainable and accurate top-n recommendations in heterogeneous information networks." IEEE Access 8 (2020): 181835-181847 (Year: 2020).*

Shi, Baoxu, et al. "Representation learning in heterogeneous professional social networks with ambiguous social connections." 2019 IEEE International Conference on Big Data (Big Data). IEEE, 2019. (Year: 2019).*

Sun et al., "Deepdom: Malicious domain detection with scalable and heterogeneous graph convolutional networks", Computer & Security vol. 99, 102057, Sep. 18, 2020, pp. 1-16.

Tang et al., "Paper Recommendation Method Based on Feature Learning of Collaborative Knowledge Graph", Computer Engineering, vol. 46, Issue (9), 2020, pp. 306-312.

Sun et al., "Research Development of Information Recommendation Based on Knowledge Graph in China", Information Studies: Theory & Application (ITA) vol. 42, Jul. 22, 2019, 8 pages.

\* cited by examiner

Job: App product manager of xxx company
-Responsible for product design of direction of new App
-Widely study product cases to help the team implement the landing of product functions
-Analyze data, and be able to give a reasonable solution pertinently
-Cooperate with the product team to complete efficient iteration on the product side
(click to view details)

Resume:
-Independently responsible for user growth of xxx project of xxx company, design reward pop-ups and other activities, and achieve 110% daily increase in daily activity throughout the year
-Build a set of ATD advertising background according to the lead, accumulate more than 300 thousand users, access tens of millions of tripartite flow
(click to view details)

Matching result: score 0.6011, recommended
Recommendation reasons are as follows (in order of importance)
1. The candidate and the position both belong to 32 related sub-fields, such as operation, senior management, etc. (click to view details)
2. The candidate meets requirements of 31 similar positions, such as App Business Department_Innovation Product Manager, etc. (click to view details)
3. The candidate and the position have 9 related skills, such as product, communication, organization, etc. (click to view details)
4. The candidate and the position belong to 13 related meta-fields, such as IT technology, operation, design, management, etc. (click to view details)
5. The candidate and the position have 50 overlapping skills, such as product, design, R&D, marketing, etc. (click to view details)
6. The resume of the candidate is similar to 33 applicants who are successfully accepted (click to view details)

METHOD AND APPARATUS OF MATCHING DATA, DEVICE AND COMPUTER READABLE STORAGE MEDIUM

CROSS-REFERENCE TO RELATED APPL

This application claims priority to the Chinese Patent Application No. 202110262413.7, filed on Mar. 9, 2021, which is incorporated herein by reference in its entirety.

TECHNICAL FIELD

The present disclosure relates to a field of artificial intelligence technology, and in particular to a method and an apparatus of matching data, a device and a computer-readable storage medium in a field of intelligent search and deep learning.

BACKGROUND

With a development of society, an enterprise provides more and more various types of jobs. While providing the different types of jobs, a requirement for each job is also refined. Therefore, job profile data in the network is rapidly increasing. With an improvement of education level, the number of talents has also increased rapidly. At this time, the number of resumes in the network is also growing rapidly.

If the enterprise obtains a proper talent, it may accelerate its rapid development. Therefore, a suitable talent needs to be found for the enterprise through a large amount of resume data and job profile data, so as to accelerate the development of the enterprise. However, there are still many technical problems that need to be solved in the process of using the resume data and the job profile data to provide the talent for the enterprise.

SUMMARY

The present disclosure provides a method of matching data, a device and a computer-readable storage medium.

According to one aspect of the present disclosure, a method of matching data is provided. The method includes obtaining a first instance of a resume and a second instance of a job profile. The method further includes determining, for a meta path, a resume feature data of the first instance and a profile feature data of the second instance, the meta path is a knowledge graph path from the resume to the job profile. The method further includes applying a classification model to the resume feature data of the first instance and the profile feature data of the second instance to determine a matching result between the first instance and the second instance.

According to another aspect of the present disclosure, an electronic device is provided. The electronic device includes: at least one processor; and a memory communicatively connected with the at least one processor; the memory stores instructions executable by the at least one processor, and the instructions are executed by the at least one processor, so that the at least one processor implements the method of the first aspect of the present disclosure.

According to another aspect of the present disclosure, a non-transitory computer-readable storage medium storing computer instructions is provided, the computer instructions are configured to cause the computer implement the method of the first aspect of the present disclosure.

It should be understood that the content described in this section is not intended to identify key or important features of the embodiments of the present disclosure, and it is not intended to limit the scope of the present disclosure. Other features of the present disclosure will be easily understood through the following description.

BRIEF DESCRIPTION OF THE DRAWINGS

The drawings are used to better understand the solutions, and do not constitute a limitation to the present disclosure, in which.

DETAILED DESCRIPTION OF EMBODIMENTS

The following describes exemplary embodiments of the present disclosure with reference to the drawings, which include various details of the embodiments of the present disclosure to facilitate understanding, and should be regarded as merely exemplary. Therefore, those skilled in the art should note that various changes and modifications may be made to the embodiments described herein without departing from the scope and spirit of the present disclosure. Likewise, for clarity and conciseness, descriptions of well-known functions and structures are omitted in the following description.

In the description of the embodiments of the present disclosure, the term "including" and similar terms should be understood as open inclusion, that is, "including but not limited to". The term "based on" should be understood as "at least partially based on". The term "an embodiment" or "the embodiment" should be understood as "at least one embodiment". The terms "first", "second", etc. may refer to different or the same objects. The following may also include other explicit and implicit definitions.

For an enterprise, efficient and accurate matching of person and job helps the enterprise build its core competitiveness. Applications of various recruitment platforms have greatly reduced a cost of resume delivery. Due to a surge in the number of resumes, a recruiter needs to spend a lot of time searching for a suitable candidate. Nowadays, when professional division of recruitment jobs is becoming more and more refined, the recruiter often needs to learn enough professional knowledge to understand resume content of a candidate.

In order to find the person who is suitable for the job from the resumes, manual determination is usually used for finding. In this way, the recruiter manually analyzes a resume description and a job requirement, and determines a matching degree between the resume and the job based on own work experience. However, in this way, the recruiter needs to spend a lot of time to read and understand the resume content of the candidate, which consumes a lot of labor costs. On the other hand, the manual determination relies on personal recruitment experience of the recruiter, and a recruitment result is subjective, which may bias a matching result.

Therefore, improved methods are provided. One method is to determine a semantic similarity between a resume text and a job text based on a natural language processing method. The method performs embedding on the resume text and the job text using Term Frequency-Inverse Document Frequency (TFIDF), Latent Semantic Analysis (LSA), Latent Dirichlet Allocation (LDA), deep learning and other strategies. By calculating a vector distance between embedded vectors, the semantic similarity between the resume text and the job text is determined. Although the semantic of the text may be used for matching, the recruitment field requires field knowledge. Only the text matching technology may not capture hidden information outside the text. For example, when recruiting a big data engineer, the job description only has a requirement of being good at Spark, while the candidate only writes being good at Hadoop in the resume. In this case, it is impossible to use prior knowledge such as the relation between existing skills to match, resulting in the bias in the matching result.

Another method is to determine the semantic similarity between the resume text and the job text based on knowledge graph and graph neural network technology. The method uses the graph neural network technology to perform embedding on nodes and relations of the knowledge graph. Finally, by measuring a spatial distance between resume and job vectors, the semantic similarity of the resume text and the job text is determined. However, for each latitude of feature vectors of the resume and the job obtained through model training, accurate physical definitions may not be found. This manner, which uses the vector space distance to determine a matching degree between the resume and the job, lacks interpretability for the matching result. Therefore, in actual use, this will cause confusion to the recruiter and is not conducive to its use.

In order to at least solve the above-mentioned problems, according to the embodiments of the present disclosure, an improved method of matching data is provided. In the method, a computing device firstly obtains a first instance of a resume and a second instance of a job profile. Then, the computing device determines, for a meta path, a resume feature data of the first instance and a profile feature data of the second instance, and the meta path is a knowledge graph path from the resume to the job profile. The computing device applies a classification model to the resume feature data of the first instance and the profile feature data of the second instance to determine a matching result between the first instance and the second instance. Through the method, a matching time of the resume and the job profile is reduced, an accuracy of matching the resume and the job profile is improved, and user experience is improved.

Figure 1:
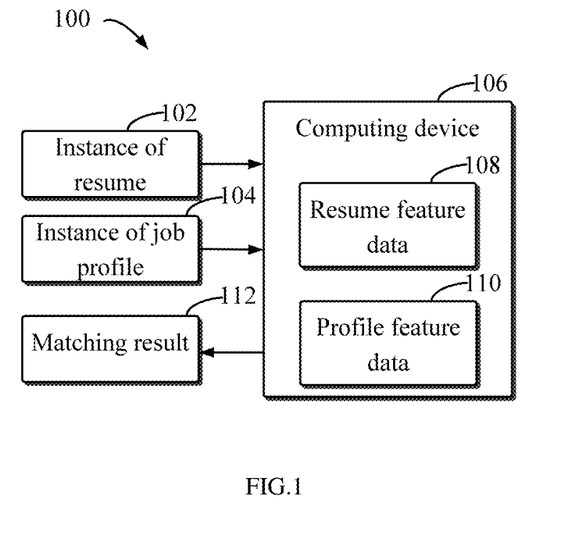
FIG. 1 illustrates a schematic diagram of an environment 100 in which a plurality of embodiments of the present disclosure may be implemented.

FIG. 1 illustrates a schematic diagram of an environment 100 in which a plurality of embodiments of the present disclosure may be implemented. An example of the environment 100 includes a computing device 106.

The computing device 106 is used to process an instance of a resume 102 and an instance of a job profile 104 obtained, so as to determine whether the instance of the resume 102 and the instance of the job profile 104 match or not. Examples of the computing device 106 include, but are not limited to, personal computers, server computers, handheld or laptop devices, mobile devices (such as mobile phones, personal digital assistants (PDA), media players, etc.), multi-processor systems, consumer electronics, small computers, large computers, distributed computing environments including any of the above systems or devices, etc. The server may be a cloud server, also known as a cloud computing server or a cloud host, which is a host product in a cloud computing service system, and solves shortcomings of difficult management and weak business scalability in traditional physical hosting and VPS services ("Virtual Private Server", or "VPS" for short). The server may also be a server of a distributed system, or a server combined with blockchain.

The instance of the resume 102 may include a skill that a job applicant has and/or a field to which the skill belongs. For ease of description, the instance of the resume 102 may also be referred to as a first instance. In some embodiments, the skill of the job applicant may refer to an ability possessed by the job applicant. For example, in a field of computer, a profile of the job applicant may describe familiarity with Spark or familiarity with Hadoop. Alternatively or additionally, the field to which the skill belongs may also be included in the profile, such as a field of big data to which Spark or Hadoop belongs. The above examples are only used to describe the present disclosure, but not to specifically limit the present disclosure. Those skilled in the art may set the skill in the resume instance and the field to which the skill belongs as needed.

In some embodiments, the instance of the job profile 104 may include a skill needed by the job and/or a technical field to which the skill needed by the job belongs. For ease of description, the instance of the job profile may also be referred to as a second instance. The skill in the instance of the job profile 104 is a skill needed to meet a job requirement. Alternatively or additionally, the instance of the job profile may also include the field to which the needed skill belongs.

FIG. 1 illustrates that the computing device 106 receives one instance of the resume 102 and one instance of the job profile 104, which is only an example, not a specific limitation to the present disclosure. Any number of instances of resumes and any number of instances of job profiles may be received. Then, a matching result between the instances of the resumes and the instances of the job profiles is given.

After obtaining the instance of the resume 102 and the instance of the job profile 104, the computing device 106 also obtains a set of meta paths. The set of meta paths is a set of paths from the resume to the job profile, which is obtained from a knowledge graph.

In order to match the resume and the job profile, the knowledge graph may be constructed. In a process of constructing the knowledge graph, multi-source heterogeneous data (including history recruitment data, retrieval data and encyclopedia data, etc.) is used to obtain entities and relations. Types of the entities include fields, skills, job titles, etc., and extracted relations include belonging, related, required, possessed, etc. For example, the skill instance Spark belongs to the field of big data, and the skill instance required by job A is Spark. Then the knowledge graph is formed by the entity instances and the relations.

According to the knowledge graph, the set of meta paths of the knowledge graph is predetermined. For example, the set of meta paths of the knowledge graph may be set to 18 meta paths. Each meta path is a path formed by the entity types and the relations, its head entity type is a resume type, and its tail entity type is a job profile type, and the path from the resume type to the job profile type is achieved through at least one intermediate entity type. The intermediate entity type of the meta path may be a field type, a skill type, and so on. For example, FIG. 2 illustrates a flowchart of an example 200 of meta paths according to some embodiments of the present disclosure.

Figure 2:
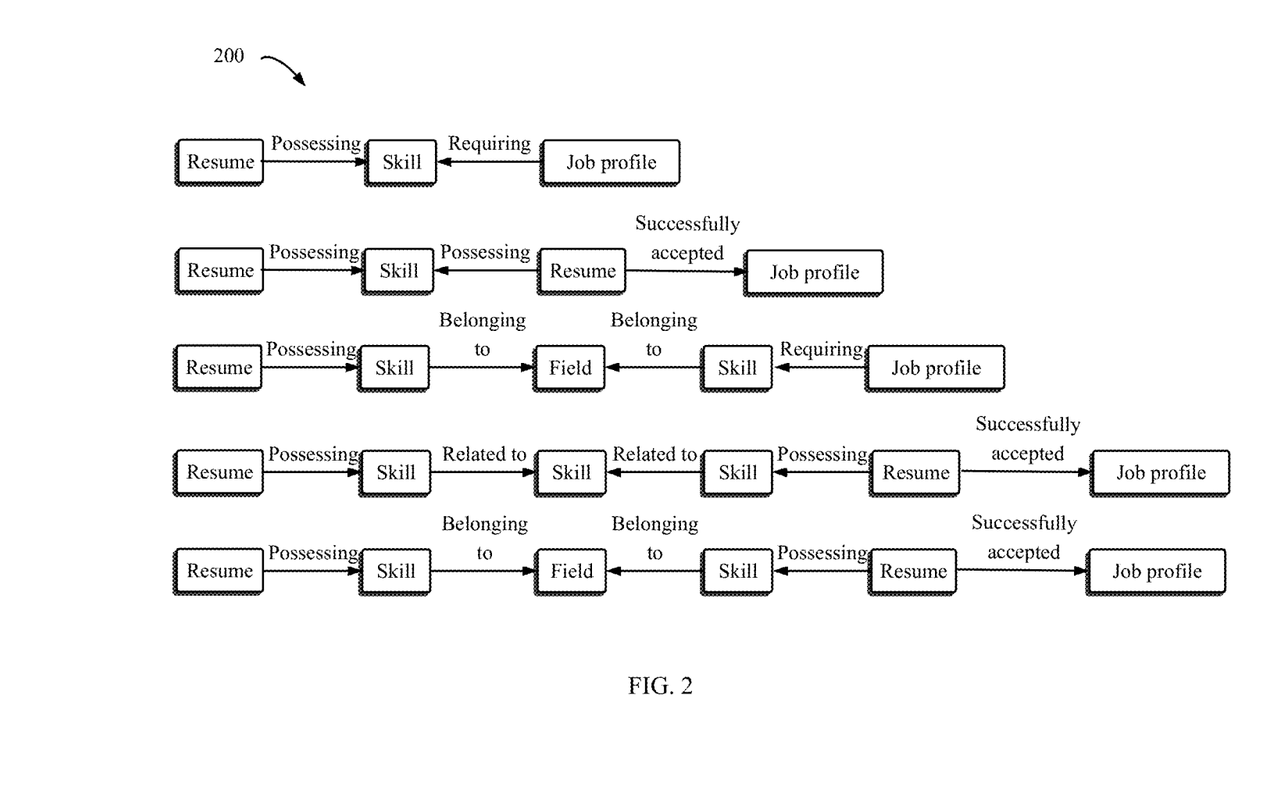
FIG. 2 illustrates a flowchart of an example 200 of meta paths according to some embodiments of the present disclosure.

As shown in FIG. 2, a first meta path is implemented from the resume type to the job profile type through the skill type, and a second meta path is from the resume type to the job profile type through the skill type and a successfully accepted resume type.

Returning to FIG. 1 for description, the computing device 106 obtains a resume feature data 108 corresponding to the instance of the resume and a profile feature data 110 corresponding to the instance of the job profile for the meta path. A matching result 112 is obtained by using the resume feature data 108 and the profile feature data 110.

The computing device 106 may present the matching result to a user. For example, the matching result may be a score of a matching degree.

Through the method, the matching time between the resume and the job profile is reduced, the accuracy of matching between the resume and the job profile is improved, and the user experience is improved.

Figure 3:
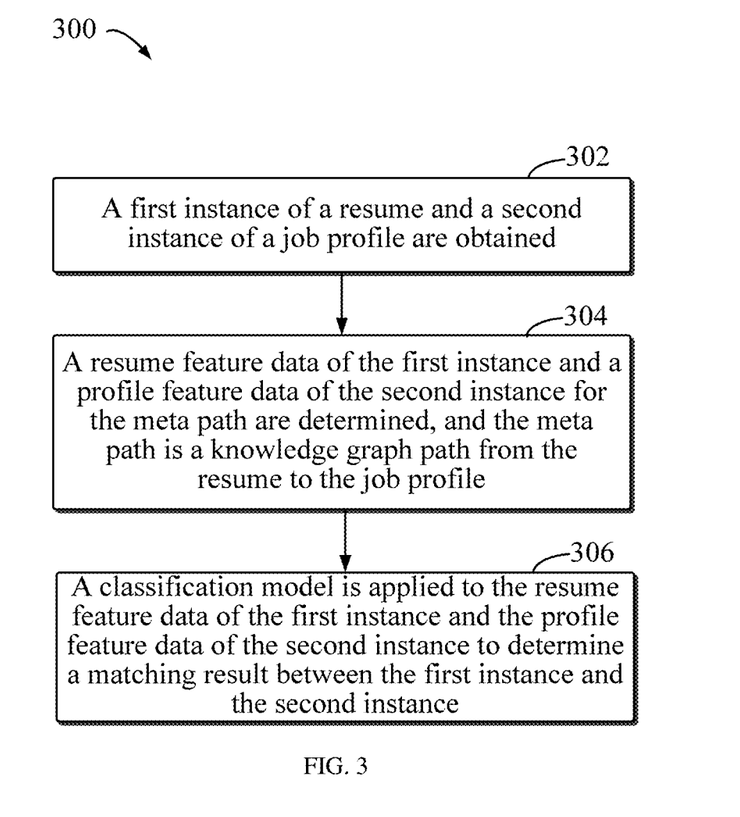
FIG. 3 illustrates a flowchart of a method 300 of matching data according to some embodiments of the present disclosure.

The environment 100 in which the plurality of embodiments of the present disclosure may be implemented is described above with reference to FIGS. 1 and 2. The following describes a flowchart of a method 300 of matching data according to some embodiments of the present disclosure in conjunction with FIG. 3. The method 300 in FIG. 3 is implemented by the computing device 106 in FIG. 1 or any suitable computing device.

At block 302, a first instance of a resume and a second instance of a job profile are obtained. For example, the computing device 106 in FIG. 1 obtains the instance of the resume 102 and the instance of the job profile 104.

In some embodiments, the first instance is a specific resume of the job applicant, which may include a technical instance possessed by the job applicant. Alternatively or additionally, the first instance also includes a field instance in which the technical instance is located. For example, the first instance may include familiarity with Spark in the field of deep learning. In some embodiments, the second instance is a specific job requirement, which includes a technical instance needed for the job. Alternatively or additionally, the second instance also includes a field instance in which the needed technical instance is located. In some embodiments, the first instance and the second instance also include a level of professional title and the like. The above examples are only used to describe the present disclosure, but not to specifically limit the present disclosure.

At block 304, a resume feature data of the first instance and a profile feature data of the second instance for the meta path are determined, and the meta path is a knowledge graph path from the resume to the job profile. For example, the computing device 106 in FIG. 1 may be used to determine the resume feature data of the instance of the resume 102 and the profile feature data of the instance of the job profile 104 for the meta path.

In some embodiments, the computing device 106 determines the number of instances of the meta path from the first instance to the second instance. Next, the computing device 106 uses the number of instances of the meta path to determine a similarity for the first instance and the second instance for the meta path. Then, the computing device 106 determines the resume feature data and the profile feature data based on the similarity. In this way, the resume feature data and the profile feature data may be quickly determined.

In some embodiments, for each meta path, a path similarity (Pathsim) matrix S is calculated between a set of resume instances including at least the first instance and a set of job profile instances including at least the second instance, and a dimension of the matrix S is a number of the resume instances×a number of the job profile instances. A (i, j)-th element in the path similarity matrix S represents the path similarity between a resume instance i and a job profile instance j on a meta path k. The meta path k is a k-th meta path in a set of preset meta paths. The path similarity $s_{ij}$ between the resume instance i and the job profile instance j on the meta path k is defined as follows, where each of i, j, and k is positive integer greater than 0.

$$s_{ij} = \frac{\text{Number of instances of meta path } k \text{ between resume instance } i \text{ and job profile instance } j}{\text{Number of instances of meta path } k \text{ where resume instance } i \text{ is head entity} + \text{Number of instances of the meta path } k \text{ where job profile instance } j \text{ is tail entity}}$$

$g_{ij}$ is used to represent the number of instances of the meta path k between the resume instance i and the job profile instance j, and G is used to represent an instance number matrix of the meta path k for the set of resume instances and the set of job profile instances. The path similarity matrix S may be obtained by multiplying and normalizing a series of connection matrices M. Given a triple pattern (entity type A, relation R, entity type B), the connection matrix may represent information of all the instances of the triple pattern, and its dimension is the number of instances of entity type A×the number of instances of entity type B. If the relation R exists between an entity instance x and an entity instance y, then the value of the (x, y)-th element of the connection matrix is 1, otherwise the value is 0, where x and y are positive integers greater than 0. Taking the third meta path in FIG. 2 as an example, S is calculated as follows.

a. First, the instance number matrix of the meta path is calculated:

$$G = M_{(resume,possessing,skill)} M_{(skill,belonging\ to,field)} M_{(skill,belonging\ to,field)}^T M_{(job,requiring,skill)}^T$$

b. Then, the (i, j)-th element of the path similarity matrix is calculated:

$$s_{ij} = \frac{g_{ij}}{\sum_{i=0}^{I} g_{ij} + \sum_{j=0}^{J} g_{ij}},$$

where $g_{ij}$ is (i, j)-th element of G.

Through the above method, the path similarity matrix for each path may be obtained. Then, a resume embedding matrix $R^{(k)}$ and a job embedding matrix $p^{(k)}$ corresponding to each meta path k are obtained through matrix decomposition. $R^{(k)}$ and $P^{(k)}$ minimize following objective functions, where $\theta_k$ is a weight of the meta path, and α is a regularization coefficient. In some embodiments, a value of α is in a range between 0.001 and 0.1.

$$\min_{R^{(k)} \in \mathbb{R}^{m \times d}, \ P^{(k)} \in \mathbb{R}^{n \times d}, \ \Theta} \sum_{k=0}^{17} \theta_k \left( \sum_{(i,j) \text{s.t. } s_{i,j}^{(k)} \neq 0} \left( s_{ij}^{(k)} - \langle R_i^{(k)}, P_j^{(k)} \rangle \right)^2 + \alpha \sum_{(i,j) \text{s.t. } s_{i,j}^{(k)} = 0} \left( \langle R_i^{(k)}, P_j^{(k)} \rangle \right)^2 \right)$$

$\mathbb{R}^{m \times d}$ represents a size of the resume embedding matrix, where m is a number of resumes, d is a size of a latent vector, $\mathbb{R}^{n \times d}$ represents a size of the job embedding matrix, where n is a number of jobs, (i,j) s.t.$s_{ij}^{(k)} \neq 0$ means that the element (i, j) in s satisfies a condition $s_{ij}^{(k)} \neq 0$, (i,j) s.t.$s_{ij}^{(k)} = 0$ means that the element (i, j) in s satisfies a condition $s_{ij}^{(k)} = 0$, and s.t. means "satisfy". $\langle R_i^{(k)}, P_j^{(k)} \rangle$ represents a dot product of $R_i^{(k)}$ and $P_j^{(k)}$. Then the resume embedding matrix and the job embedding matrix are used as the resume feature data and the profile feature data, respectively.

In some embodiments, the computing device 106 obtains the resume feature data by performing a matching search in stored reference instances of the resume and corresponding reference resume feature data. The computing device 106 first obtains a first plurality of reference resume feature data corresponding to a first plurality of reference instances of the resume. Then, according to an entity type instance in the meta path included in the first instance, it is determined whether there is a reference instance matching the first instance among the first plurality of reference instances or not. For example, the computing device 106 may determine whether there is a reference instance corresponding to the first instance or not according to a number or percentage of the available skills in the first instance that match the available skills in the reference instance, for example, when the number of matched skill instances exceeds a threshold, or the percentage of the number of available skills that are the same in the first instance and the reference instance to the number of available skills in the reference instance exceeds a threshold percentage.

If there is a reference instance corresponding to the first instance among the first plurality of reference instances, the reference resume feature data corresponding to the reference instance is used as the resume feature data. Through the above method, the resume feature data may be quickly determined. If no reference instance matching the first instance is found from the stored reference instances, the above formula may be used to calculate the resume feature data.

In some embodiments, the computing device 106 obtains the profile feature data by performing a matching search in stored reference instances of the job profile and corresponding reference profile feature data. The computing device 106 obtains a second plurality of reference profile feature data corresponding to a second plurality of reference instances of the job profile. The computing device 106 then uses an entity type instance in the meta path included in the second instance to determine whether there is a reference instance corresponding to the second instance among the second plurality of reference instances or not. For example, the computing device 106 may determine whether there is a reference instance corresponding to the second instance or not according to a number or percentage of matches between the needed skills in the second instance and the needed skills in the reference instance, for example, when the number of matched skill instances exceeds the threshold, or the percentage of the number of needed skills that are the same in the second instance and the reference instance to the number of needed skills in the reference instance exceeds a threshold percentage.

If there is a reference instance corresponding to the second instance among the second plurality of reference instances, the reference profile feature data corresponding to the reference instance is used as the profile feature data. Through the above method, the profile feature data may be obtained quickly and accurately. If no reference instance matching the second instance is found from the stored reference instances, the profile feature data may be obtained through the above formula calculation.

In some embodiments, the resume feature data and the profile feature data may be determined from the pre-stored reference instance firstly. The resume feature data and the profile feature data determined by the reference instance are directly used only when the reference instance of the first instance and the reference instance of the second instance are both found. Otherwise, the resume feature data and the profile feature data are determined by calculation using the above-mentioned formula. The above examples are only used to describe the present disclosure, but not to specifically limit the present disclosure.

At block 306, a classification model is applied to the resume feature data of the first instance and the profile feature data of the second instance to determine a matching result between the first instance and the second instance. For example, the computing device 106 of FIG. 1 applies the classification model to the resume feature data of the first instance and the profile feature data of the second instance to determine the matching result between the first instance and the second instance.

In some embodiments, the resume embedding matrix and the job embedding matrix $R_i^{(k)}$, $P_j^{(k)}$ of the resume instance i and the job profile instance j for the meta path k are obtained, and k=0, 1, . . . , N. N is a positive integer greater than 0. If the user sets 18 meta paths, then N is 18. Next, a dot product of the resume embedding matrix and the job profile embedding matrix of N meta paths is used to input the classification model to obtain the matching result.

In some embodiments, a classifier is trained by using a plurality of sample resume instances, a plurality of sample job profile instances and a sample matching result between the plurality of sample resume instances and the plurality of sample job profile instances. Through the above method, accurate model parameters may be obtained.

When training the classification model, through the above method, the resume embedding matrix and the job profile embedding matrix of the sample resume instance and the sample job profile instance for each meta path are obtained. Then the obtained resume embedding matrix and job profile embedding matrix for a set of meta paths are dot produced as feature data and the feature data is input into the classifier. Next, the classifier is trained based on a sample application result. For example, for each (resume i, job j, application result) combination, a final training data is obtained, the resume embedding matrix and the job profile embedding matrix for the meta path are dot produced. For example, $\langle R_i^{(k)}, p_j^{(k)} \rangle$ is performed for each of the 18 meta paths, and k=0, 1, . . . , 17 is used as a feature to fit the classifier.

In some embodiments, the classification model is at least one of: a logistic regression model, a neural network model and a gradient boosting decision tree model. Through the above method, the matching result may be obtained faster and more accurately.

In some embodiments, the computing device 106 may determine a specific selection factor for the matching of the resume instance and the job profile instance, that is, give a recommendation reason. The computing device 106 obtains, from a set of meta paths, at least one meta path related to the selection factor for the second instance. Then, the computing device determines a score of the selection factor based on the resume feature data and the profile feature data for a meta path in the at least one meta path, so as to rank the selection factor. Through the above method, the main selection factor may be quickly determined.

Figure 4:
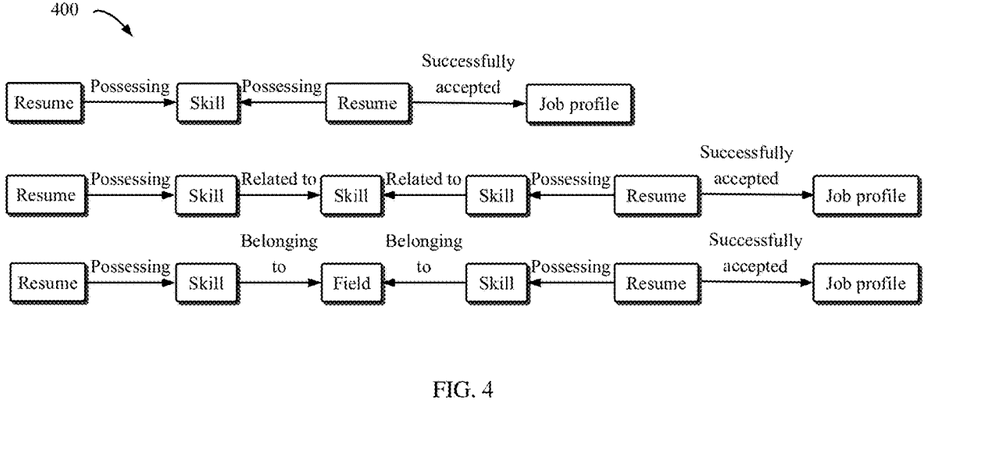
FIG. 4 illustrates a schematic diagram of an example 400 of meta paths corresponding to the same recommendation reason according to some embodiments of the present disclosure.

In some embodiments, after obtaining the resume embedding matrix $R^{(k)}$ and the job embedding matrix $P^{(k)}$, the computing device 106 may decompose role played by each meta path in a recommendation result, and automatically fill a recommendation reason template. Each recommendation reason corresponds to at least one meta path construction. As shown in FIG. 4, a recommendation reason "the candidate has a similar resume to other successfully accepted applicants" includes three paths.

According to the obtained meta path embedding matrix dot product $\langle R_i^{(k)}, P_j^{(k)} \rangle$, k∈recommendation reason, and the product of its corresponding feature weight, the score of each recommendation reason is determined. The feature weight is a weight coefficient of each meta path embedding matrix dot product determined when the model is trained. Then, each recommendation reason is ranked according to the score for presentation to the user.

In some embodiments, the computing device 106 may also present the user with instances in some important meta paths associated with the recommendation reason. The computing device 106 determines a target type in a target meta path in the at least one meta path. Next, based on a similarity between the first instance and the instance of the target type and a similarity between the second instance and the instance of the target type, an indication value indicating an importance of the instance of the target type is determined. Then, based on the indication value, an instance of the target type is displayed in association with the selection factor. Through the above methods, more detailed information may be provided to the user.

Figure 5:
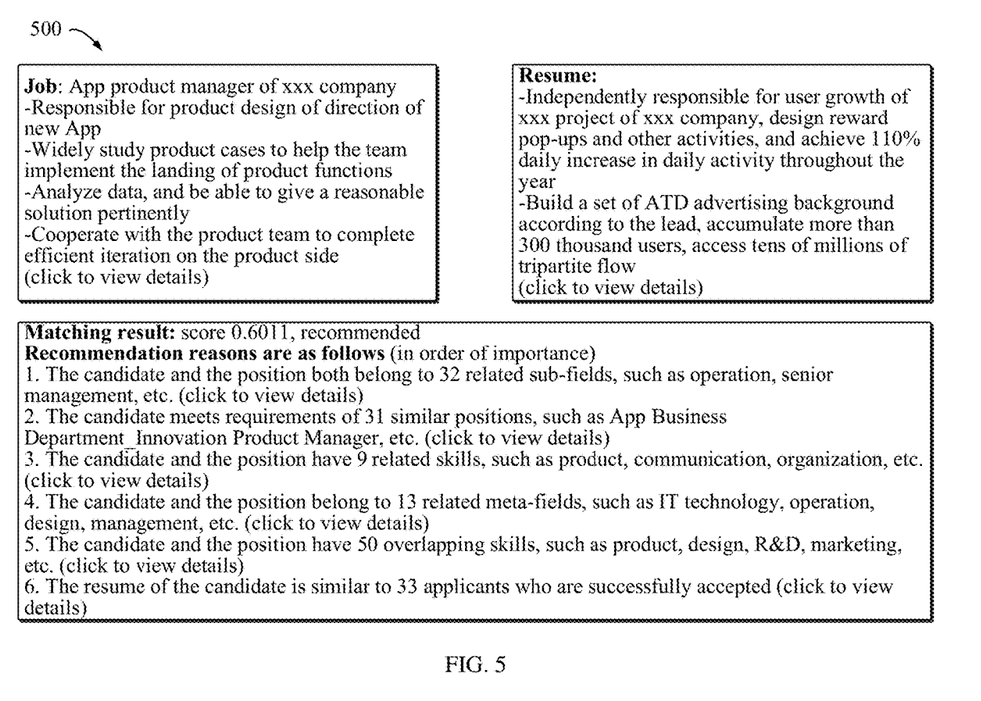
FIG. 5 illustrates a schematic diagram of an example 500 for presenting a matching result according to some embodiments of the present disclosure.

A central entity type is defined for each recommendation reason, then an instance collection of the central entity type passed by all meta path instances corresponding to the recommendation reason is counted. An instance in the instance collection of the central entity type may be an instance of the entity type located between the resume type and the job profile type in the meta path, that is, the central entity type is used as the target type. Then, the most important N central entity instances in the collection are returned. The importance of the central entity instance is defined as follows:

Importance of the central entity instance (resume instance i, job profile instance j, meta path k)=$\Sigma_{k \in recommendation\ reason}$ path similarity(resume instance i, central entity instance, left sub meta path k)×path similarity (central entity instance, job resume instance j, right sub meta path k), where the left sub meta path k represents the resume type to the central entity type in the meta path k, and the right sub meta path k represents the central entity type to the job type in the meta path k. It shows that if the central entity instance is more similar to the resume instance, then the central entity instance is more important. Similarly, if the central entity instance is more similar to the job profile instance, then the central entity instance is more important. The recommendation reason and the important central entity instance are presented to the user together, as shown in FIG. 5, the operation and senior management are presented together with the first recommendation reason.

Through the method, the matching time between the resume and the job profile is reduced, the accuracy of matching between the resume and the job profile is improved, and the user experience is improved.

Figure 6:
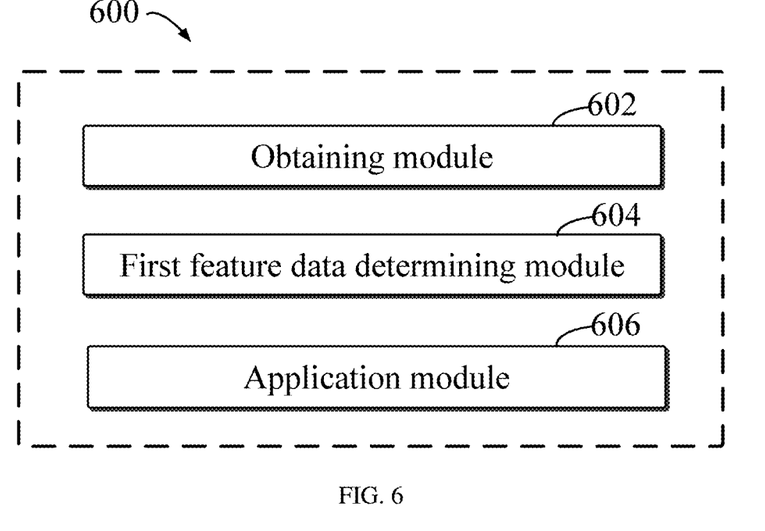
FIG. 6 illustrates a block diagram of a device 600 of matching data according to some embodiments of the present disclosure.

FIG. 6 illustrates a schematic block diagram of an apparatus 600 of matching data according to the embodiments of the present disclosure. As shown in FIG. 6, the apparatus 600 includes an obtaining module 602 configured to obtain a first instance of a resume and a second instance of a job profile. The apparatus 600 further includes a first feature data determining module 604 configured to determine, for a meta path, a resume feature data of the first instance and a profile feature data of the second instance, and the meta path is a knowledge graph path from the resume to the job profile. The apparatus 600 further includes an application module 606 configured to apply a classification model to the resume feature data of the first instance and the profile feature data of the second instance to determine a matching result between the first instance and the second instance.

In some embodiments, the first feature data determining module 604 includes a number determining module configured to determine a number of instances of the meta path from the first instance to the second instance; a similarity determination module configured to determine a similarity of the first instance and the second instance for the meta path based on the number of instances of the meta path; and a second feature data determining module configured to determine the resume feature data and the profile feature data based on the similarity.

In some embodiments, the first feature data determining module 604 includes: a reference resume feature data obtaining module configured to obtain a first plurality of reference resume feature data corresponding to a first plurality of reference instances of the resume; a first reference instance determining module configured to determine whether there is a reference instance matching the first instance among the first plurality of reference instances or not based on an entity type instance in the meta path included in the first instance; and a resume feature data determining module configured to, use, in response to there being a reference instance corresponding to the first instance among the first plurality of reference instances, a reference resume feature data corresponding to the reference instance as the resume feature data.

In some embodiments, the first feature data determining module further includes: a reference profile feature data obtaining module configured to obtain a second plurality of reference profile feature data corresponding to a second plurality of reference instances of the job profile; a second reference instance determining module configured to determine whether there is a reference instance corresponding to the second instance among the second plurality of reference instances or not based on an entity type instance in the meta path included in the second instance; and a profile feature data determining module configured to, use, in response to there being a reference instance corresponding to the second instance among the second plurality of reference instances, a reference profile feature data corresponding to the reference instance as the profile feature data.

In some embodiments, the classification model is at least one of: a logistic regression model, a neural network model and a gradient boosting decision tree model.

In some embodiments, the apparatus 600 further includes: a meta path obtaining module configured to obtain, from a set of meta paths, at least one meta path related to a selection factor for the second instance; and a scoring module configured to determine a score of the selection factor based on a resume feature data and a profile feature data for a meta path in the at least one meta path, so as to rank the selection factor.

In some embodiments, the apparatus 600 further includes: a target type determining module configured to determine a target type in a target meta path in the at least one meta path; an indication value determination module configured to determine an indication value indicating an importance of an instance of the target type based on a similarity between the first instance and the instance of the target type and a similarity between the second instance and the instance of the target type; and a display module configured to display the instance of the target type in association with the selection factor based on the indication value.

In some embodiments, a classifier is trained by using a plurality of sample resume instances, a plurality of sample job profile instances and a sample matching result between the plurality of sample resume instances and the plurality of sample job profile instances.

In the technical solution of the present disclosure, the collection, storage, use, processing, transmission, provision, and disclosure of the user's personal information involved are in compliance with relevant laws and regulations, and do not violate public order and good customs.

According to the embodiments of the present disclosure, the present disclosure also provides an electronic device, a readable storage medium and a computer program product.

Figure 7:
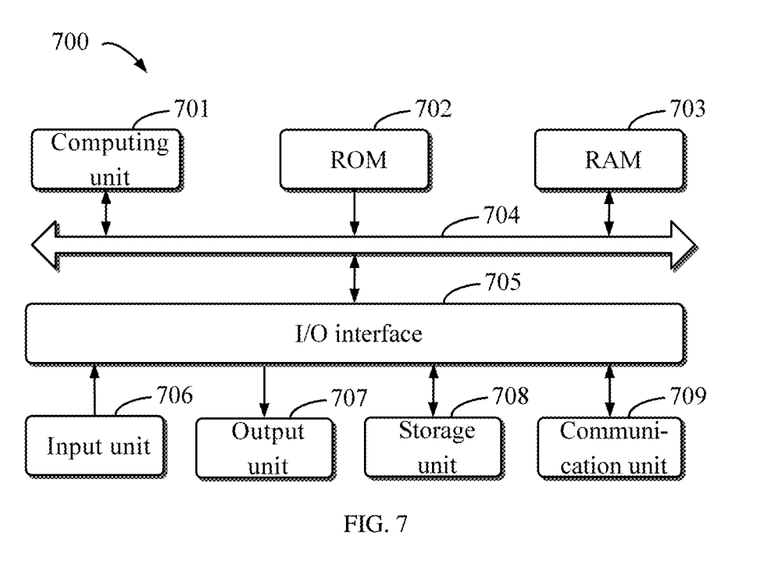
FIG. 7 illustrates a block diagram of a device 700 capable of implementing a plurality of embodiments of the present disclosure.

FIG. 7 illustrates a schematic block diagram of an example electronic device 700 that be used to implement embodiments of the present disclosure. The example electronic device 700 may be used to implement the computing device 106 in FIG. 1. The electronic device is intended to represent various forms of digital computers, such as laptop computers, desktop computers, workstations, personal digital assistants, servers, blade servers, mainframe computers and other suitable computers. The electronic device may also represent various forms of mobile devices, such as personal digital processing, cellular phones, smart phones, wearable devices, and other similar computing devices. The components shown herein, their connections and relationships, and their functions are merely examples, and are not intended to limit the implementation of the present disclosure described and/or required.

As shown in FIG. 7, the device 700 includes a computing unit 701, which may execute various appropriate actions and processing according to a computer program stored in a read-only memory (ROM) 702 or a computer program loaded from a storage unit 708 into a random access memory (RAM) 703. In the RAM 703, various programs and data required for the operation of the device 700 may also be stored. The computing unit 701, the ROM 702 and the RAM 703 are connected to each other through a bus 704. An input/output (I/O) interface 705 is also connected to the bus 704.

A plurality of components in the device 700 are connected to the I/O interface 705, including: an input unit 706, such as a keyboard, a mouse, etc.; an output unit 707, such as various types of displays, speakers, etc.; a storage unit 708, such as a magnetic disk, an optical disk, etc.; and a communication unit 709, such as a network card, a modem, a wireless communication transceiver, and so on. The communication unit 709 allows the device 700 to exchange information/data with other devices through a computer network such as the Internet and/or various telecommunication networks.

The computing unit 701 may be various general-purpose and/or special-purpose processing components with processing and computing capabilities. Some examples of computing unit 701 include, but are not limited to, central processing unit (CPU), graphics processing unit (GPU), various dedicated artificial intelligence (AI) computing chips, various computing units that run machine learning model algorithms, digital signal processing (DSP) and any appropriate processor, controller, microcontroller, etc. The computing unit 701 performs the various methods and processing described above, such as the method 300. For example, in some embodiments, the method 300 may be implemented as computer software programs, which are tangibly contained in the machine-readable medium, such as the storage unit 708. In some embodiments, part or all of the computer program may be loaded and/or installed on the device 700 via the ROM 702 and/or the communication unit 709. When the computer program is loaded into the RAM 703 and executed by the computing unit 701, one or more steps of the method 300 described above may be implemented. Alternatively, in other embodiments, the computing unit 701 may be configured to implement the above-mentioned method in any other suitable manner (for example, by means of firmware).

Various implementations of the systems and technologies described in the present disclosure may be implemented in digital electronic circuit systems, integrated circuit systems, field programmable gate arrays (FPGA), application specific integrated circuits (ASIC), application-specific standard products (ASSP), system-on-chip (SOC), complex programming logic device (CPLD), computer hardware, firmware, software and/or their combination. The various implementations may include: being implemented in one or more computer programs, the one or more computer programs may be executed and/or interpreted on a programmable system including at least one programmable processor, the programmable processor may be a dedicated or general programmable processor. The programmable processor may receive data and instructions from a storage system, at least one input device and at least one output device, and the programmable processor transmit data and instructions to the storage system, the at least one input device and the at least one output device.

The program codes used to implement the method of the present disclosure may be written in any combination of one or more programming languages. The program codes may be provided to the processors or controllers of general-purpose computers, special-purpose computers or other programmable data processing devices, so that the program codes enable the functions/operations specified in the flow-charts and/or block diagrams to be implemented when the program codes executed by a processor or controller. The program codes may be entirely executed on the machine, partly executed on the machine, partly executed on the machine and partly executed on the remote machine as an independent software package, or entirely executed on the remote machine or server.

In the context of the present disclosure, the machine-readable medium may be a tangible medium, which may contain or store a program for use by the instruction execution system, apparatus, or device or in combination with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the above-mentioned content. More specific examples of the machine-readable storage medium would include electrical connections based on one or more wires, portable computer disks, hard disks, random access memory (RAM), read-only memory (ROM), erasable programmable read-only memory (EPROM or flash memory), optical fiber, portable compact disk read-only memory (CD-ROM), optical storage device, magnetic storage device or any suitable combination of the above-mentioned content.

In order to provide interaction with users, the systems and techniques described here may be implemented on a computer, the computer includes: a display device (for example, a CRT (cathode ray tube) or LCD (liquid crystal display) monitor) for displaying information to the user; and a keyboard and a pointing device (for example, a mouse or trackball). The user may provide input to the computer through the keyboard and the pointing device. Other types of devices may also be used to provide interaction with users. For example, the feedback provided to the user may be any form of sensory feedback (for example, visual feedback, auditory feedback or tactile feedback); and any form (including sound input, voice input, or tactile input) may be used to receive input from the user.

The systems and technologies described herein may be implemented in a computing system including back-end components (for example, as a data server), or a computing system including middleware components (for example, an application server), or a computing system including front-end components (for example, a user computer with a graphical user interface or a web browser through which the user may interact with the implementation of the system and technology described herein), or in a computing system including any combination of such back-end components, middleware components or front-end components. The components of the system may be connected to each other through any form or medium of digital data communication (for example, a communication network). Examples of communication networks include: local area network (LAN), wide area network (WAN) and the Internet.

The computer system may include a client and a server. The client and the server are generally far away from each other and usually interact through the communication network. The relationship between the client and the server is generated by computer programs that run on the corresponding computers and have a client-server relationship with each other. The server can be a cloud server, a distributed system server, or a server combined with a blockchain.

It should be understood that the various forms of processes shown above may be used to reorder, add or delete steps. For example, the steps described in the present disclosure may be executed in parallel, sequentially or in a different order, as long as the desired result of the technical solution disclosed in the present disclosure may be achieved, which is not limited herein.

The above-mentioned specific implementations do not constitute a limitation on the protection scope of the present disclosure. Those skilled in the art should understand that various modifications, combinations, sub-combinations and substitutions may be made according to design requirements and other factors. Any modification, equivalent replacement and improvement made within the spirit and principle of the present disclosure shall be included in the protection scope of the present disclosure.

What is claimed is:

1. A method of matching data, comprising:
    obtaining a first instance of a resume and a second instance of a job profile;
    determining, for a meta path, a resume feature data of the first instance and a profile feature data of the second instance, wherein the meta path is a knowledge graph path from the resume to the job profile;
    applying a classification model to the resume feature data of the first instance and the profile feature data of the second instance to determine a matching result between the first instance and the second instance;
    obtaining, from a set of meta paths comprising the meta path, at least one meta path related to a selection factor for the second instance, wherein the selection factor is one of a plurality of reasons for matching the first instance with the second instance;
    determining a score of the selection factor based on resume feature information and profile feature information for the at least one meta path, so as to perform a ranking on the plurality of reasons, wherein each meta path includes a head entity, a tail entity, and at least one intermediate entity, a type of the head entity is a resume type, a type of the tail entity is a job profile type, a type of the at least one intermediate entity includes at least one of a field type, a skill type, and a job title type, and meta paths corresponding to different reasons have different combinations of entities and relations;
    determining a target type in a target meta path in the at least one meta path;
    determining an indication value indicating an importance of an instance of the target type based on a similarity between the first instance and the instance of the target type and a similarity between the second instance and the instance of the target type; and
    displaying the instance of the target type in association with the selection factor based on the indication value, wherein
    a classifier is trained by using a plurality of sample resume instances, a plurality of sample job profile instances and a sample matching result between the plurality of sample resume instances and the plurality of sample job profile instances.

2. The method of claim 1, wherein determining the resume feature data and the profile feature data comprises:
    determining a number of instances of the meta path from the first instance to the second instance;
    determining a similarity of the first instance and the second instance for the meta path based on the number of instances of the meta path; and
    determining the resume feature data and the profile feature data based on the similarity.

3. The method of claim 1, wherein determining the resume feature data and the profile feature data comprises:
    obtaining a first plurality of reference resume feature data corresponding to a first plurality of reference instances of the resume;
    determining whether there is a reference instance matching the first instance among the first plurality of reference instances or not based on an entity type instance in the meta path included in the first instance; and
    using, in response to there being a reference instance corresponding to the first instance among the first plurality of reference instances, a reference resume feature data corresponding to the reference instance as the resume feature data.

4. The method of claim 3, wherein the determining whether there is a reference instance matching the first instance among the first plurality of reference instances or not based on an entity type instance in the meta path included in the first instance comprises:
    determining whether there is a reference instance corresponding to the first instance or not according to a number or a percentage of the entity type instance in the meta path included in the first instance matched with the entity type instance in the reference instance.

5. The method of claim 3, wherein determining the resume feature data and the profile feature data further comprises:
obtaining a second plurality of reference profile feature data corresponding to a second plurality of reference instances of the job profile;
determining whether there is a reference instance corresponding to the second instance among the second plurality of reference instances or not based on an entity type instance in the meta path included in the second instance; and
using, in response to there being a reference instance corresponding to the second instance among the second plurality of reference instances, a reference profile feature data corresponding to the reference instance as the profile feature data.

6. The method of claim 1, wherein determining the resume feature data and the profile feature data further comprises:
obtaining a second plurality of reference profile feature data corresponding to a second plurality of reference instances of the job profile;
determining whether there is a reference instance corresponding to the second instance among the second plurality of reference instances or not based on an entity type instance in the meta path included in the second instance; and
using, in response to there being a reference instance corresponding to the second instance among the second plurality of reference instances, a reference profile feature data corresponding to the reference instance as the profile feature data.

7. The method of claim 1, wherein the classification model is at least one of: a logistic regression model, a neural network model and a gradient boosting decision tree model.

8. An electronic device, comprising:
at least one processor; and
a memory communicatively connected with the at least one processor; wherein,
the memory stores instructions executable by the at least one processor, and the instructions are executed by the at least one processor, so that the at least one processor implements operations of matching data, comprising:
obtaining a first instance of a resume and a second instance of a job profile;
determining, for a meta path, a resume feature data of the first instance and a profile feature data of the second instance, wherein the meta path is a knowledge graph path from the resume to the job profile;
applying a classification model to the resume feature data of the first instance and the profile feature data of the second instance to determine a matching result between the first instance and the second instance;
obtaining, from a set of meta paths comprising the meta path, at least one meta path related to a selection factor for the second instance, wherein the selection factor is one of a plurality of reasons for matching the first instance with the second instance;
determining a score of the selection factor based on resume feature information and profile feature information for the at least one meta path, so as to perform a ranking on the plurality of reasons, wherein each meta path includes a head entity, a tail entity, and at least one intermediate entity, a type of the head entity is a resume type, a type of the tail entity is a job profile type, a type of the at least one intermediate entity includes at least one of a field type, a skill type, and a job title type, and meta paths corresponding to different reasons have different combinations of entities and relations;
determining a target type in a target meta path in the at least one meta path;
determining an indication value indicating an importance of an instance of the target type based on a similarity between the first instance and the instance of the target type and a similarity between the second instance and the instance of the target type; and
displaying the instance of the target type in association with the selection factor based on the indication value,
wherein
a classifier is trained by using a plurality of sample resume instances, a plurality of sample job profile instances and a sample matching result between the plurality of sample resume instances and the plurality of sample job profile instances.

9. The electronic device of claim 8, wherein the at least one processor further implements:
determining a number of instances of the meta path from the first instance to the second instance;
determining a similarity of the first instance and the second instance for the meta path based on the number of instances of the meta path; and
determining the resume feature data and the profile feature data based on the similarity.

10. The electronic device of claim 8, wherein the at least one processor further implements:
obtaining a first plurality of reference resume feature data corresponding to a first plurality of reference instances of the resume;
determining whether there is a reference instance matching the first instance among the first plurality of reference instances or not based on an entity type instance in the meta path included in the first instance; and
using, in response to there being a reference instance corresponding to the first instance among the first plurality of reference instances, a reference resume feature data corresponding to the reference instance as the resume feature data.

11. The electronic device of claim 10, wherein the at least one processor further implements:
determining whether there is a reference instance corresponding to the first instance or not according to a number or a percentage of the entity type instance in the meta path included in the first instance matched with the entity type instance in the reference instance.

12. The electronic device of claim 10, wherein the at least one processor further implements:
obtaining a second plurality of reference profile feature data corresponding to a second plurality of reference instances of the job profile;
determining whether there is a reference instance corresponding to the second instance among the second plurality of reference instances or not based on an entity type instance in the meta path included in the second instance; and
using, in response to there being a reference instance corresponding to the second instance among the second plurality of reference instances, a reference profile feature data corresponding to the reference instance as the profile feature data.

13. The electronic device of claim 8, wherein the classification model is at least one of: a logistic regression model, a neural network model and a gradient boosting decision tree model.

14. A non-transitory computer-readable storage medium storing computer instructions, wherein the computer instructions are configured to cause the computer implement operations of matching data, comprising:

obtaining a first instance of a resume and a second instance of a job profile;

determining, for a meta path, a resume feature data of the first instance and a profile feature data of the second instance, wherein the meta path is a knowledge graph path from the resume to the job profile;

applying a classification model to the resume feature data of the first instance and the profile feature data of the second instance to determine a matching result between the first instance and the second instance;

obtaining, from a set of meta paths comprising the meta path, at least one meta path related to a selection factor for the second instance, wherein the selection factor is one of a plurality of reasons for matching the first instance with the second instance;

determining a score of the selection factor based on resume feature information and profile feature information for the at least one meta path, so as to perform a ranking on the plurality of reasons, wherein each meta path includes a head entity, a tail entity, and at least one intermediate entity, a type of the head entity is a resume type, a type of the tail entity is a job profile type, a type of the at least one intermediate entity includes at least one of a field type, a skill type, and a job title type, and meta paths corresponding to different reasons have different combinations of entities and relations;

determining a target type in a target meta path in the at least one meta path;

determining an indication value indicating an importance of an instance of the target type based on a similarity between the first instance and the instance of the target type and a similarity between the second instance and the instance of the target type; and displaying the instance of the target type in association with the selection factor based on the indication value, wherein a classifier is trained by using a plurality of sample resume instances, a plurality of sample job profile instances and a sample matching result between the plurality of sample resume instances and the plurality of sample job profile instances.

* * * * *